United States Patent [19]

Hammer et al.

[11] Patent Number: 5,194,296
[45] Date of Patent: Mar. 16, 1993

[54] METHOD OF PRODUCING A COILABLE CERAMIC VENEER IN UNFIRED CONDITION

[75] Inventors: Josef Hammer, Kronberg; Werner Voelker, Bad Vibel; Paul F. Hahmann, Wertheim am Main, all of Fed. Rep. of Germany

[73] Assignees: Degussa AG, Frankfurt; Glaswerk Schuller GmbH, Wertheim am Main, both of Fed. Rep. of Germany

[21] Appl. No.: 604,001

[22] Filed: Oct. 26, 1990

[30] Foreign Application Priority Data

Nov. 3, 1989 [DE] Fed. Rep. of Germany ....... 3936561

[51] Int. Cl.$^5$ .......................... B05D 3/12; B05D 1/00; B29D 7/00
[52] U.S. Cl. ..................................... 427/177; 264/212; 427/180; 427/190; 427/209; 427/372.2; 427/380
[58] Field of Search .................... 156/89; 264/60, 212; 427/376.1, 376.2, 209, 269, 287, 379, 380, 381, 180, 190, 372.2, 177

[56] References Cited

U.S. PATENT DOCUMENTS

| | | |
|---|---|---|
| 2,307,332 | 1/1943 | Parsons . |
| 4,158,689 | 6/1979 | Pett et al. ............................ 264/63 |
| 4,207,371 | 6/1980 | Otto ..................................... 428/212 |
| 4,265,794 | 5/1981 | Pett et al. .......................... 264/126 X |

OTHER PUBLICATIONS

Chemical Abstract No. 139 566 K, Oct. 19, 1987, p. 337.

*Primary Examiner*—Jan H. Silbaugh
*Assistant Examiner*—Christopher A. Fiorilla
*Attorney, Agent, or Firm*—Beveridge, DeGrandi, Weilacher & Young

[57] ABSTRACT

The process involves coating on both sides of an endless track of a base material consisting of inorganic fibers, preferably a glass fiber fleece, with aqueous ceramic slips, and drying of the coating. The base material with a weight per unit area of 30–200 g/m$^2$ is coated with a slip, at least 500 g/m$^2$, preferably 1000–2000 g/m$^2$, without the use of an additional support, preferably on one side with a paste and on the other side with a glaze slip. The slips contain 3–20% by weight organic binders that decompose uniformly and without residue between 250° and 600° C. The dried, unfired veneers in free suspension may be coiled and uncoiled and subjected to continual decoration and firing processes.

13 Claims, No Drawings

METHOD OF PRODUCING A COILABLE CERAMIC VENEER IN UNFIRED CONDITION

INTRODUCTION AND BACKGROUND

The present invention relates to a method of producing a ceramic veneer that is coilable in unfired condition and thereby may be decorated and fired as an endless strip. The ceramic veneer is formed of a laminar base material consisting of inorganic fibers, preferably a glass-fiber mat or fleece that is coated on both sides with ceramic material, preferably on one side with a paste layer and on the other side with a glaze layer. For the production of the veneer, organic ceramic slips containing organic binders are applied on the base material and dried while in free suspension.

In order to provide large-surface construction units with ceramic coatings, there is an increased need for ceramic veneering. Although different approaches for producing such veneers have been selected, they remain unsatisfactory in some areas in terms of application characteristics and/or the economy of production processes.

In U.S. Pat. No. 2,307,332, the production of ceramic veneers is described, where a fine-particle ceramic paste containing a fusible binder is inserted into a furnace on a combustible support. During firing, only the binder melts thereby binding the ceramic particles together. It was actually also suggested to imbed a reinforcement layer, e.g., a metal screen or mineral wool in the paste. However, it was not possible to thus increase the strength of the veneers. In unfired condition, such veneers cannot be coiled or rolled up without damage and in this form subjected to further refinement steps.

According to German Patent 20 61 105, ceramic veneers are produced by applying a thinly fluid ceramic slip on a water-permeable or absorbent combustible support medium and subsequent combined firing, whereby the support burns up. In order to avoid crack formations during predrying of the slip layer, a layer of glass or mineral fibers was placed in the slip layer applied on the combustible support according to German Patent 22 01 435; a patent of addition to DE 20 61 105. It was possible to apply a second slip layer on the fiber layer; in addition, a glaze-producing paste could be applied to the layer that would be on top.

The use of the combustible support is also considered a requirement for systems containing a fiber layer, in order to make coating and drying possible. However, it appeared that the combustion of the support during firing was not without problems. The ceramic veneers of the type described above are also not coilable in unfired condition, since the lack of binders with an elastifying effect necessarily results in cracking during coiling and uncoiling.

Ceramic plates or tiles consisting of a ceramic paste layer, a fleece (non-woven fabric) or a cloth, e.g., of glass fibers, rolled on the moist paste string, optionally decorated, and with a glaze placed on top, are known from German Published Patent Application DE-OS 32 46 270. However, this document does not suggest how such systems in the form of veneers can be fabricated. A veneer consisting of at least two slip layers of different composition and a glass fleece arranged on the upper slip layer and/or between two slip layers is the object of German Patent DE-PS 26 39 522. For the production of such a veneer, the slips are applied on an endless rotating strip, the glass fleece is then added, and the composite is subsequently fired in the furnace. The unfired article is unsuitable for coiling and instead should be fired directly in connection with drying.

An unfired glaze in the form of a film where the starting materials for the glaze to a large extent, preferably predominantly, and optimally completely, are in fiber form is known from German Patent 19 36 888. In so far as particle-shaped starting materials for the glaze are also used, they are applied in the form of a suspension containing 0.1 to 2 percent by weight based on the dispersed fatty substances on a fleece, a tissue or texture, e.g., by soaking these in the suspension. In this document, reference is made to the fact that a higher concentration of binders is unfavorable, since they decompose during firing and cause blisters to form in the glaze. The object of DE-PS 19 36 888 thus solely focuses on an unfired glaze film and not on a ceramic veneer predominantly composed of particle-shaped ceramic materials. To the extent that the unfired glaze film in DE-PS 19 36 888, in addition to the fiber ingredients, also contains particle-shaped glaze ingredients, these must be very similar in composition to those of the fiber material. Thus, the selection possibilities of glaze ingredients and their composition are very restricted.

In EP-B 159,514, a coating-layer material on fleece or woven fabric is disclosed, displaying a coating of powdery inorganic material only on one side. The coating contains at least 6 percent by weight of completely dry organic binders. The coating-layer material, however, is not subjected to any ceramic baking. As a result, problems in connection with blister formation through decomposition of the polymer and/or an unsatisfactory compound of fibrous materials and particles do not occur. For the production of the coating-layer material, a glass-fiber fleece is, for example, coated on a doctor knife apparatus with a paste consisting of the inorganic powder, a plastic dispersion, and usual additives, and dried. Applicable are fleeces with a weight per unit area ranging between 35 and 350 g/m$^2$. The coating weights range between 150 to 450 g/m$^2$.

SUMMARY OF THE INVENTION

An object of the invention resides in a simple procedure for producing a coilable ceramic veneer in unfired condition by coating a base material of inorganic fibers with particle-shaped ceramic material. The unfired veneer should be safe, i.e., without crack formation and without sticking of the surfaces of the veneer, for coiling and uncoiling, and be able in this form to be subjected to further decoration steps and firing. Moreover, it is an object to be able to produce the veneer in thicknesses ranging from 0.1 mm to 5 mm at the possible lowest weight per unit area of the base material and with a large coating quantity in terms of paste and/or glaze.

In achieving the above and other objects, one feature of the invention resides in a process of producing a ceramic coilable veneer in unfired condition by coating a base or support material of inorganic fibers with aqueous slips containing particle-shaped ceramic materials. In carrying out the invention, one or more slip layers are applied on both sides of an endless track of the base material without the use of an additional support, with intermediate drying after coating of the first side. After coating of both sides, the product is dried in a self-supporting state to a residual moisture concentration of maximally 10% by weight. The veneer, if desired following decoration, is then rolled up. The base material of inorganic fibers with a weight per unit area between 30 to 200 g/m² is used and coated with at least 500 g/m² of ceramic material.

The slips used contain an organic binder in an amount of 3 to 20% by weight relative to the solids that decompose mostly uniformly and without residue during heating from 250° to 600° C.

In a more detailed aspect of the invention, the base material used displays a fleece structure. Preferably, the fleece consists of glass fibers with a weight per unit area of 50 to 100 g/m² and a fiber thickness of 8 to 15 μm is used.

With regard to carrying out the invention, the base material is coated on one side with a ceramic paste slip, and on the other side with a glaze slip, whereby the veneer thickness should be 0.5 to 5 mm, preferably 1 to 3 mm.

For the base material of inorganic fibers to be coated, laminar formations with, e.g., a fleece, weave, or texture (knitted) structure, are suitable and a fleece structure is especially preferred.

The unfired ceramic veneer produced according to the invention is 0.5 to 5 mm, preferably 1–2 mm, thick, and may also be characterized as a "green" film or unfired film. In unfired condition, the veneer can be coiled and uncoiled several times and redirected over rollers without causing any damage which would make the veneer unusable. For coiling, so-called cylinders are suitable whose diameters for thicker veneers should be greater than for thinner veneers; 6-inch cylinders can be used for 1–2 mm thick veneers. Such cylinders are known in the art.

The specific advantages of the ceramic veneers coilable in unfired condition lie in the fact that they are very simple and economical to produce, and in contrast to the green films on, e.g., paper supports, display high dimensional stability. As a result, they can be printed upon with high accuracy and, in this form, marketed directly and/or decorated in a continual process by the customer or producer. For example, decorating can be done through printing with ceramic colors and/or structuring of the surface, and finally, that they can be fired, in general, at 800° to 1300° C.

After firing, a veneer is produced that makes possible coating of very large construction units without seams. Moreover, any shaped parts can be cut to size according to the laser cutting process. By corresponding selection of the coating materials, veneers with properties compatible with the application purposes can be produced.

DETAILED DESCRIPTION OF THE INVENTION

It was not to be anticipated that a laminar base material, particularly a fiber fleece consisting of inorganic fibers, such as glass fibers, stone and slag fibers, where glass fibers are preferred, could be coated on both sides in the multiple amount of its own weight with slips containing particle-shaped ceramic materials without including the use of an underlying support. For a weight per unit area of the base material ranging from 30–200 g/m², preferably 50–100 g/m², the amount of coating should be at least 500 g/m², preferably ca. 1000 g/m² to 2000 g/m², however, weights per unit area of approx. 5000 g/m² are also possible. A weight ratio of the entire coating per square meter to the weight per unit area of the base material (g/m²) exceeding 10:1, particularly in the range 20–40 to 1 is preferred. The ceramic green film thus predominantly consists of particle-shaped ingredients.

A fleece consisting of glass fibers with a weight per unit area of 50–100 g/m² and fiber strength in the range of 8–15 micrometers is well suited. The use of a fleece consisting of fibers with greater diameters results in disadvantages rather than advantages. The chemical composition of the glass fibers and thus their physical properties, as well as the softening profile may differ substantially. Especially preferred are fibers consisting of so-called E-glass, generally containing 53–55 percent by weight $SiO_2$, 14–16 percent by weight $Al_2O_3$, 6–9 percent by weight $B_2O_3$, 20–25 percent by weight alkaline earth oxides, and less than 1 percent by weight alkali oxides and that softens at approximately 800° C.

The fiber fleece must exhibit sufficient tensile strength, preferably around or above 100 N/5 cm in order to absorb the required coating without a support medium. The strength of the fleece must be present both in moist and dry condition and remain present during heating of the green film to the temperature of the first sinter processes. Moreover, the fibers must be stable over a large pH area. The minimum amount of coating is determined by the porosity of the fleece, the maximal coating essentially depends on the strength data of the fleece during the mentioned process conditions.

The green films according to the invention, i.e., the coilable unfired veneers, are produced by coating the open base material with particle-shaped ceramic materials and aqueous slips containing inorganic binders, and by drying of the coating. The slightly pre-stressed endless base material is initially coated on the first side without additional support, as necessary with the previously known process, while using per-se known coating devices. The doctor-knife technique is preferred. One or more additional layers may be applied on the first coat immediately thereafter or after intermediate drying. The base material thus obtained and coated on one side is dried to such a degree that it can be used, coiled and turned over by redirecting devices. The turned over base material coated on one side is subsequently coated once or several times on the second side, dried to a residual moisture of less than 10% by weight, preferably below 8% by weight, at temperatures up to approximately 250° C. and, optionally coiled following decoration steps and, if necessary, cooling.

The applied slips contain fine-particle ceramic ingredients as used for producing ceramic paste layers—englobe layers are understood to be part thereof—and glazes. According to a preferred embodiment, the base material is coated with a paste, or optionally an englobe layer on one side, and, on the other side, a glaze layer. The composition of the paste layer may correspond to that of, e.g., earthenware, stoneware, or porcelain.

Ingredients of the paste layer are formed primarily generally of clays, and moreover, kaolin, feldspar, nepheline, and finely-ground quartz. In addition, sinter additives such as glaze frits and selected oxides and/or flow-promoting fluxing agents for modifying the properties may be included therein. A high density of the paste layer is obtained through the presence of feldspars and/or sinter additives and by a high firing temperature. The slip containing glaze ingredients may contain the usual ingredients of a raw and/or a fritted glaze, where the latter is preferred. Production of the paste and the glaze slip proceeds in the usual manner and, to the extent necessary, includes wet grinding and the additional use of organic and inorganic additives for modifying the flow behavior of the slip. The solids concentration of the aqueous slips depends on the selected ceramic ingredients and the desired processing viscosity. In general, it is endeavored to use a well-flowable slip for the coating with the desired application strength at a solids concentration as high as possible.

In order to produce a veneer with a qualitatively high-grade coating layer, preferably a glaze, the base material and the glaze must be adjusted for each other with respect to their physical properties. This is obtained, as was now found, by using a glaze frit or glaze-forming ingredients with such a composition that their softening temperatures correspond approximately to that of the base material, or when both ingredients of the system exhibit eutectic melting behavior. If, for instance, a low-fusing glass-fiber fleece, e.g., consisting of C-glass with a softening temperature around 650° C., is combined with a high-fusing glaze, cracking of the glaze can easily occur during firing. The person skilled in the art can get a picture of the softening point and the mutual wetting ability in the heating microscope based on the melting behavior of the fiber and the glaze frit. While, according to the state of the art, it was assumed that a similar composition of the fiber and the glaze was an obligatory precondition for compatibility, it was now recognized that systems of varying compositions also are compatible, when their melting and wetting properties are approximately identical or at least very similar. According to the invention, the ability of the ingredients of the ceramic veneer to combine was therefore significantly increased. Up to 250° C., the base material may not undergo any decrease in strength.

An essential feature of the process according to the invention concerns the organic binders being used. The binder that is used in a quantity of 3-20 percent by weight, preferably 5-10 percent by weight, relative to the solids, must exhibit a high solids binding capacity and impart the required flexibility to the unfired ceramic veneer. By using binders that may be elastically cross-linked before or during drying, a green foil that is especially suitable for coiling and uncoiling is obtained, since the binder enables the repositioning of the particles of the coating in their original positions.

The behavior of the binder during firing, which is an important feature, was recognized. Not only must the binder burn up or decompose and escape from the coating without leaving any residue, but decomposition must occur evenly during heating of the green film within the temperature range 250°-600° C. Binders that decompose within a narrow temperature interval crack open the coating with blisters. Moreover, the binders must be stable with regard to ingredients of the slips and exhibit sufficient shear stability.

Acrylate polymers and copolymers, acrylate/acrylonitrile copolymers, ethylene/vinyl acetate copolymers, ethylene/vinyl acetate/acrylate terpolymers, styrol/acrylate copolymers, as well as polyurethane are suitable as binders; elastifying cross-linking binders of the mentioned classes are preferably used. Instead of the mentioned polymers and copolymers on an acrylate basis, those based on methacrylate may also be used; $C_1$ to $C_{12}$—alkyl, particularly $C_1$ to $C_4$ alkyl acrylates or methacrylates, are preferably used. In practice, the mentioned binders are preferably used in the form of aqueous, 40-60% by weight dispersions.

Instead of using binders in aqueous suspensions, binders in powder form may also be added to the slips. In order to obtain the necessary effect, the polymers usable as powder must be distributed in a finely divided condition and melt below 250° C. to such an extent that the particle- and fiber-shaped ingredients of the veneer are at least partially covered and thus bound. Polymers of the above-mentioned classes, and also polymers such as polyethylene, polypropylene, polybutylene, polyvinyl acetate, and copolymers with polyolefins, and furthermore, polyester and polyamides may be used as powders.

Moreover, the slips may contain processing agents, such as viscosity regulators, cross-linking and dispersion agents and defoamers. To the extent possible, low-foaming anionic and non-ionic products are preferred as cross-linking and dispersion agents. The person skilled in the art must establish the compatibility of the agent(s) with the other ingredients of the system through a pretest. Defoamers are not generally required, however, before or during coating, it may be advantageous to use a defoamer, however, not a silicone defoamer, on the surface of the fleece.

The process according to the invention is simple and economically practicable as was shown. The product of the invention in the form of a roll several meters wide may be subjected to the most varied decoration processes.

One or both sides of the green film, preferably the side provided with a glaze, may be decorated continuously by using decorating colors, decorating glazes, precious metal preparations, and other ceramic decoration products. Such compositions are known in the art. The firing of the green film may occur within normal to quick firing. According to the type of glaze and the firing conditions, glossy, semi-matte, silky-matte, and matte surfaces can be obtained.

Compared to conventional processes of producing plate-shaped ceramic articles, addition to the waste water of clay and glaze slush is eliminated with the process according to the invention.

The following example serves to illustrate the invention.

A glass fleece uncoiled from a roller was coated upon a continuous coating device using doctor-knife coating technique on one side with a paste and, on the other side, with a glaze, whereby after the first coating, intermediate drying, and after coating of the second side, drying with hot air was performed at a temperature up to 250° C. to a residual moisture concentration of 6 percent by weight.

A glass fiber fleece consisting of E-glass with a fiber strength of 10 μm and a weight per unit area of 50 g/m² was used.

The paste layer corresponded to stoneware; the chemical composition was (all % indications of the example are % by weight): $SiO_2$ 77.1%, $Al_2O_3$ 18.5%, $B_2O_3$ 2.4% Alkali/alkaline earth oxides 2% (1.2% $Na_2O$, 0.3% $K_2O$, 0.5% CaO). In the slip, 90% spraying clay and 10% of a glaze frit softening at 800° C. was used.

The composition of the glaze: $SiO_2$ 47.2%, $Al_2O_3$ 25.0%, $B_2O_3$ 0.8%, $ZrO_2$ 10%, alkaline earth oxides 10%, ZnO 3.4%, $Na_2O$ 3.4%, $K_2O$ 0.2%. In the glaze slip, usual ingredients of a raw glaze, including feldspar, kaolin, corundum, zircon oxide, alumina hydrate, calcite, talcum, as well as a glaze frit softening at 830° C.

Per 1000 kg paste or glaze ingredients, the slips contained a 145 kg binder dispersion—a 50% aqueous dispersion free of softening agents, of a thermally cross-linkable copolymer of butylacrylate and acrylonitrile—175 kg water (in addition to the water of the dispersion), and 29 kg commercial wetting-agent preparations on the basis of fat-modified anionic surfactants, and non-ionic fatty alcohol ethoxylates.

The green film, capable of being coiled and uncoiled, was 2 mm thick. Firing took place in a through furnace during 45 minutes at 1120°–1130° C.

Further variations and modifications of the foregoing will be apparent to those skilled in the art and are intended to be encompassed by the claims appended hereto.

German priority application P 39 36 561.1 is incorporated herein and relied on.

We claim:

1. A method of producing a ceramic veneer which is coilable in unfired condition, comprising: coating a base material of inorganic fibers with an aqueous slip containing a particle-shaped ceramic material, said coating being formed by one or more slip layers applied on both sides of said base material, said coating applied to the base material without the use of an additional support, after coating of one side, intermediate drying then coating an opposite side, drying the base material coated on both sides to a residual moisture concentration of maximally 10% by weight in a self-supporting state, said base material consisting of inorganic fibers with a weight per unit area of 30 to 200 g/m$^2$, said coating is at least 500 g/m$^2$ of ceramic material, said slip containing at least one organic binder in an amount of 3 to 20% by weight relative to the solids that essentially decompose uniformly and without residue, during heating from 250° to 600° C.; and the unfired veneer is coiled without damage, wherein the unfired veneer may be decorated prior to coiling.

2. The method according to claim 1, wherein the base material displays a fleece structure.

3. The method according to claim 2, wherein said fleece consists of glass fibers with a weight per unit area of 50 to 100 g/m$^2$ and a fiber thickness of 8 to 15 μm.

4. The method according to claim 1, wherein the base material is coated on one side with a ceramic paste slip, and on the opposite side with a glaze slip, whereby the resulting veneer thickness is 0.5 to 5 mm.

5. The method according to claim 4, wherein the thickness is 1 to 3 mm.

6. The method according to claim 1, wherein the binder is selected from the group consisting of acrylate polymers or copolymers, acrylate/acrylonitrile copolymers, ethylene/vinyl acetate copolymers, ethylene/vinyl acetate/acrylate terpolymers, styrene/acrylate copolymers, and polyurethane.

7. The method according to claim 1, wherein the base material coated on both sides is decorated.

8. The method according to claim 1, wherein the base material is in the form of an endless track.

9. The method according to claim 1, wherein the amount of coating is 1000 g/m$^2$ to 2000 g/m$^2$.

10. The method according to claim 1, wherein the unfired veneer is 0.5 to 5 mm in thickness.

11. The method according to claim 1, wherein the amount of binder is 3 to 20% by weight relative to solids content of the slip.

12. The method according to claim 1, wherein the binder is a polymer powder selected from the group consisting of polyethylene, polypropylene, polyvinyl acetate or its copolymers with polyolefins, polyamide, and polyester that melt below 250° C.

13. The method according to claim 1, wherein the binder is an elastically cross-linkable polymer or copolymer.

* * * * *